United States Patent
Bothra

[19]

[11] Patent Number: 6,129,613
[45] Date of Patent: Oct. 10, 2000

[54] SEMICONDUCTOR MANUFACTURING APPARATUS AND METHOD FOR MEASURING IN-SITU PRESSURE ACROSS A WAFER

[75] Inventor: Subhas Bothra, San Jose, Calif.

[73] Assignee: Philips Electronics North America Corp., New York, N.Y.

[21] Appl. No.: 09/016,152

[22] Filed: Jan. 30, 1998

[51] Int. Cl.[7] .................. B24B 7/00; B24B 9/00; H01L 29/82
[52] U.S. Cl. ...................... 451/66; 257/417; 257/419; 451/5
[58] Field of Search .................. 257/417, 419, 257/753, 762, 766; 451/5, 66

[56] References Cited

U.S. PATENT DOCUMENTS

| | | | |
|---|---|---|---|
| 5,455,445 | 10/1995 | Kurtz et al. | 257/419 |
| 5,511,428 | 4/1996 | Goldberg et al. | 73/777 |
| 5,585,673 | 12/1996 | Joshi et al. | 257/751 |
| 5,641,988 | 6/1997 | Huang et al. | 257/692 |
| 5,903,058 | 5/1999 | Akram | 257/778 |
| 5,928,968 | 7/1999 | Bothra et al. | 438/745 |
| 5,962,776 | 10/1999 | Lehmann | 73/49.3 |

*Primary Examiner*—David Hardy
*Assistant Examiner*—Allan R. Wilson
*Attorney, Agent, or Firm*—Martine Penilla & Kim, LLP

[57] ABSTRACT

A pressure sensing structure for measuring a local pressure on a surface of a wafer and a wafer carrier for communicating with the wafer is disclosed. The pressure sensing structure includes a conductive via extending through the wafer, a pressure transducer electrically connected to a first side of the conductive via, and a connector arranged in electrical contact with a second side of the conductive via. Further, a wafer incorporating multiple such pressure sensing structures is disclosed. In addition, a pressure sensing structure further including integrated circuitry in electrical contact with the pressure transducer and a conductive via is disclosed. The pressure sensing structure is well suited for use in sensing pressure variations throughout the surface of the wafer when a selected wafer layer is undergoing a chemical mechanical polishing operation.

3 Claims, 8 Drawing Sheets

SEMICONDUCTOR MANUFACTURING APPARATUS AND METHOD FOR MEASURING IN-SITU PRESSURE ACROSS A WAFER

BACKGROUND OF THE INVENTION

1. Field of the Invention

The present invention relates generally to integrated circuit fabrication and, more particularly, to an apparatus and method for measuring in-situ pressure across a semiconductor wafer during chemical-mechanical polishing of the wafer.

2. Description of the Related Art

In the fabrication of semiconductor devices, wafers are typically processed through a number of well known process operations. Some of the conventional process operations include oxide deposition operations, metallization sputtering operations, photolithography operations, etching operations and various types of planarization operations. Because a semiconductor device is fabricated as a multi-level device that may have a number of metallization levels (and oxide levels interdisposed), the need to planarize some of the layers before a next layer is applied becomes very apparent, particularly when the topographical variations start to increase. Consequently, if the topographical variations become too pronounced, the fabrication of additional levels may become restrictive, in that the topographical variations can limit the degree of precision needed to fabricate dimension sensitive integrated circuit devices.

One common planarization technique is referred to as chemical mechanical polishing (CMP). FIG. 1A shows a simplified drawing of a CMP apparatus 100 that is used to planarize various material layers that may be applied to a wafer 102 during a fabrication process. As is well known, CMP apparatus 100 includes a robot arm 108 that has a wafer carrier 106 for handling the wafer 102 during a polishing operation. As shown, the actual planarization of the wafer 102 occurs when the robot arm 108 lowers the wafer carrier 106 down to a polishing pad 104. To complete a planarization operation, polishing pad 104 is usually conditioned (to maintain the polishing pad's texture) before each new planarization operation is performed, and a polishing slurry having a specific pH level is applied to the surface of polishing pad 104 and is selected according to the type of material to be planarized. Once the polishing pad 104 is rotating at a given rpm, the wafer carrier 106 is lowered and placed in contact with the polishing pad 104. Once contact is made with the polishing pad 104, the CMP apparatus 100 will supply an offsetting back pressure BP to a back surface 103 of the wafer 102. A particular polishing rate will be attained depending upon the polishing pad and wafer surface material characteristics, and the offsetting back pressure.

FIG. 1B illustrates a cross-sectional view of a substrate 121 of the wafer 102 during a stage of the fabrication process prior to a CMP operation. The substrate 121 includes an oxide layer 122 upon which various structures 124 have been formed. Typically, in the fabrication of a single layer, multiple structures are formed with varying widths, geometric shapes and separations from one another. After the formation of structures 124, the fabrication process typically includes depositing an oxide layer 126 over the structures 124. As can be seen in FIG. 1B, after deposition, the surface of oxide layer 126 is not smooth but rather characterized by an irregular topography. The particular topography is driven by the underlying structures, particularly by the width, shape and separation between the structures. For example, although structure 124c and structure 124d span similar widths, FIG. 1B shows that the topography of oxide layer 126 overlying each of these devices differs. Of course, other geometric structures cause variations in the topography of oxide layer 126 that are different from those shown.

When wafer 102 is subjected to CMP to planarize the surface of oxide layer 126, the pressures experienced by that surface may vary across the surface corresponding to the particular topography. As is well known, these varying pressures will necessarily cause different polishing rates across the surface being planarized. These variations can be reduced with a CMP machine and process that is configured to programmably control the offsetting back pressure that is applied through a wafer carrier to the back side of a wafer. An example of such a CMP machine and process can be found in U.S. patent application Ser. No. 08/956,836 titled "Methods and Apparatus for Polishing Wafers" which is incorporated herein by reference.

Conventionally, the various CMP machine parameters for given structures and corresponding topography of a wafer are set by experimental testing. For example, a test wafer is typically placed within the CMP machine, and by trial and error the CMP parameters are modified until the appropriate settings are established. Unfortunately, the nature of this process may require several wafers to be successively used and likely destroyed within the CMP machine. In addition, because of the trial and error nature of the process, this process is time-consuming. For example, not only must various wafers be placed in and taken out of the CMP machine, but also the CMP machine parameters must be iteratively changed until the proper pressures and parameters are found for the correct polishing for that particular wafer topography. Further, this is done not only the first time such a topography is to be used in the CMP machine, but is also repeated after maintenance is performed on the machine, because such maintenance and re-calibration will typically alter the characteristics of the CMP processing. Additionally, the CMP machine parameters may change slowly over time through use of the machine, resulting in undesired polishing of wafers. Unfortunately, when this occurs the experimental testing may again need to be repeated to re-calibrate the process to the wafer.

In view of the foregoing, there is a need for a method and apparatus for setting CMP parameters more quickly and less expensively.

SUMMARY OF THE INVENTION

Broadly speaking, the present invention fills these needs by providing an apparatus and method for monitoring the local pressure across a wafer, the local pressure data then being used to identify efficiently the appropriate CMP parameters needed for the particular structure on the wafer. It should be appreciated that the present invention can be implemented in numerous ways, including as a process, an apparatus, a system, a device or a method. Several inventive embodiments of the present invention are described below.

In one embodiment, a pressure sensing structure for measuring a local pressure on a surface of a wafer, includes a conductive via extending through the wafer, a pressure transducer that is electrically connected to a first side of the conductive via, and a connector arranged in electrical contact with a second side of the conductive via.

In another embodiment, a pressure sensing structure for measuring a local pressure on a surface of a wafer, includes a conductive via extending through the wafer, a pressure transducer that is electrically connected to a first side of the conductive via, a voltage measuring device in electrical contact with the pressure transducer, an analog to digital converter in electrical contact with the voltage measuring device, a multiplexer in electrical contact with the analog to digital converter and the first side of the conductive via, and a connector arranged in electrical contact with a second side of the conductive via.

In yet another embodiment, a wafer includes multiple pressure sensing structures as described above.

One advantage of the present invention is that the pressure encountered by a wafer surface can be monitored while the pressure is applied to that surface. More specifically, the local pressure encountered by the wafer surface near a pressure sensing structure can be monitored during chemical mechanical polishing of the wafer, in situ. An additional advantage of the present invention is that through the in situ monitoring various parameters of the CMP machine can be set to attain desired pressure distributions across the wafer surface. This leads to less time and money used to set up CMP machines for processing, at the initiation of processing a new wafer design, after maintenance, and for periodic monitoring.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

An invention for measuring in-situ pressure across the wafer during CMP processing is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

One way that is employed to measure pressure that is encountered by a surface, is to fabricate pressure transducers into the surface. A pressure transducer includes two metal portions separated by a cavity. These metal portions are oriented such that when a pressure to be measured is applied to the transducer, the distance between the metal portions across the cavity changes. If a current is supplied between the metal portions across the cavity, this change of distance across the cavity changes the capacitance, which can be detected by monitoring the change in voltage through the metal portions. By calibrating the pressure transducer, these voltage changes can be used to determine the pressure applied to the transducer. Therefore, by fabricating multiple pressure transducers across a surface, a distribution of pressure across the surface can be detected.

In an embodiment of the present invention, a wafer is provided that incorporates pressure transducers on the surface of the wafer, the pressure transducers being electrically connected to contact pads on the back side of the wafer. These contact pads are configured to cooperate with electrical connections on a CMP machine wafer carrier which are themselves electrically connected, for example through the robot arm, to a sensor device which can use the signals received from the pressure transducers to determine the pressure encountered by the wafer during CMP.

Figure 1A:
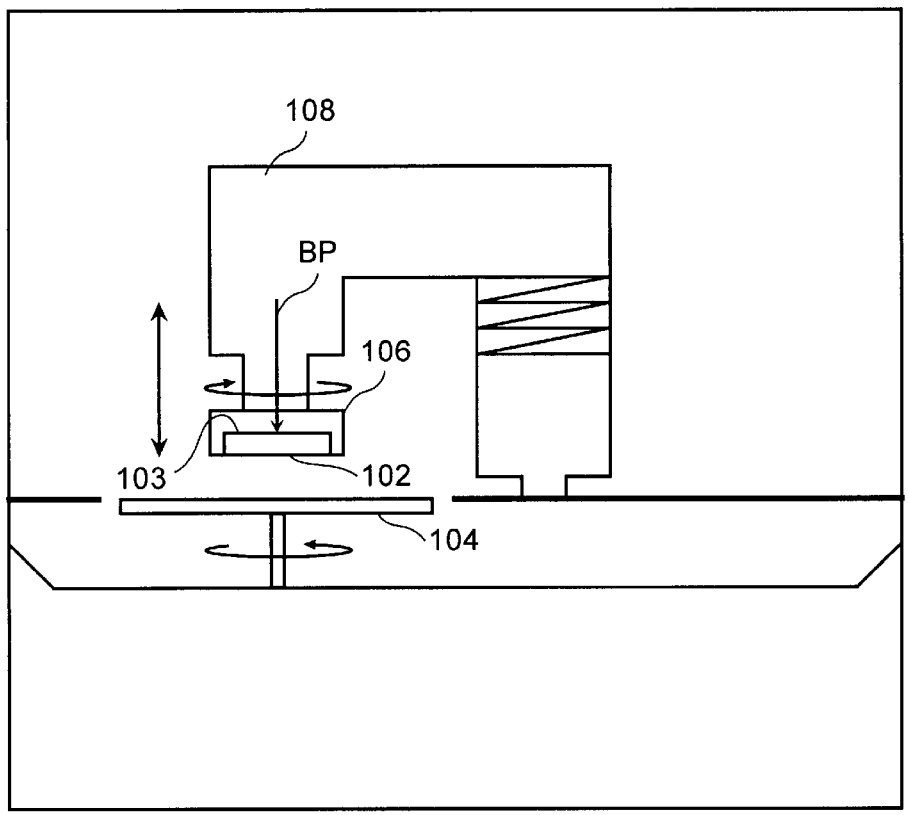
FIG. 1A depicts a chemical mechanical polishing machine of the prior art.
Figure 1B:
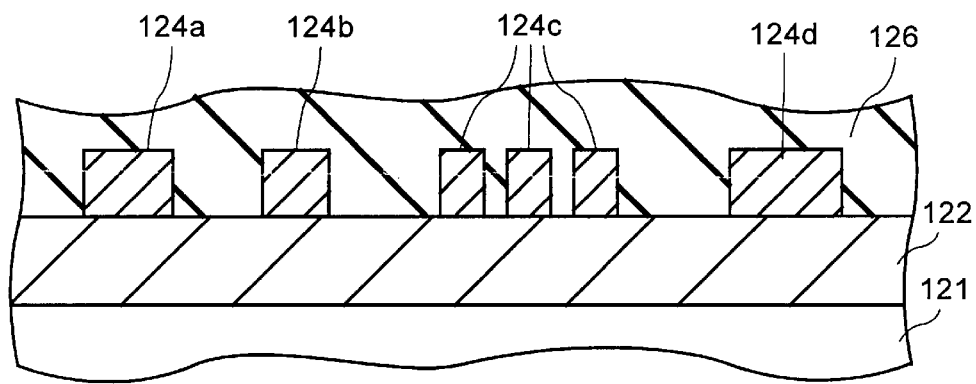
FIG. 1B depicts a cross-sectional view of a wafer at a point in a fabrication process before chemical mechanical polishing.
Figure 2A:
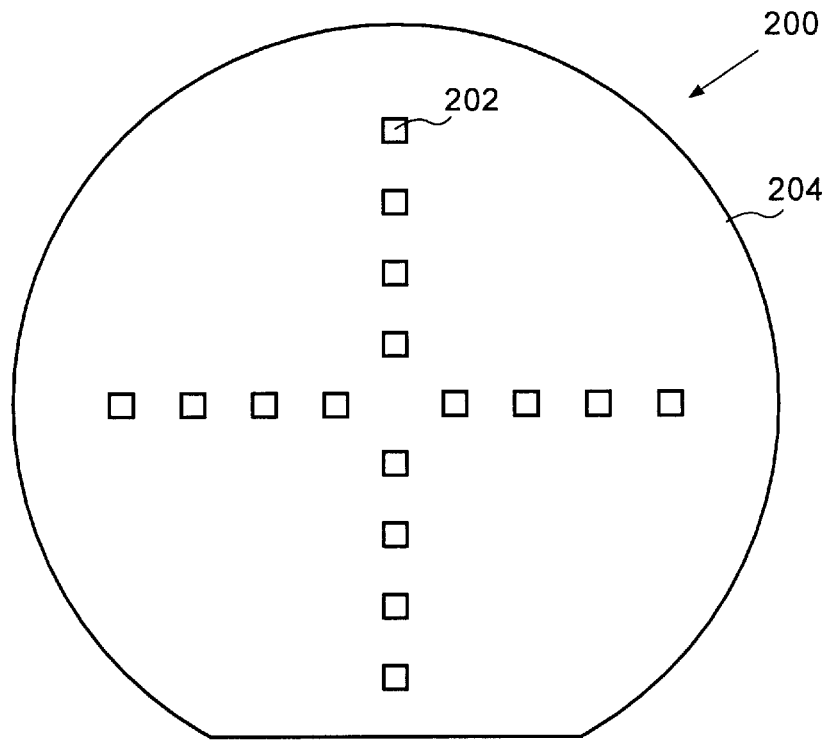
FIG. 2A shows a top view of a wafer incorporating pressure sensing structures according to an embodiment of the present invention.
Figure 2B:
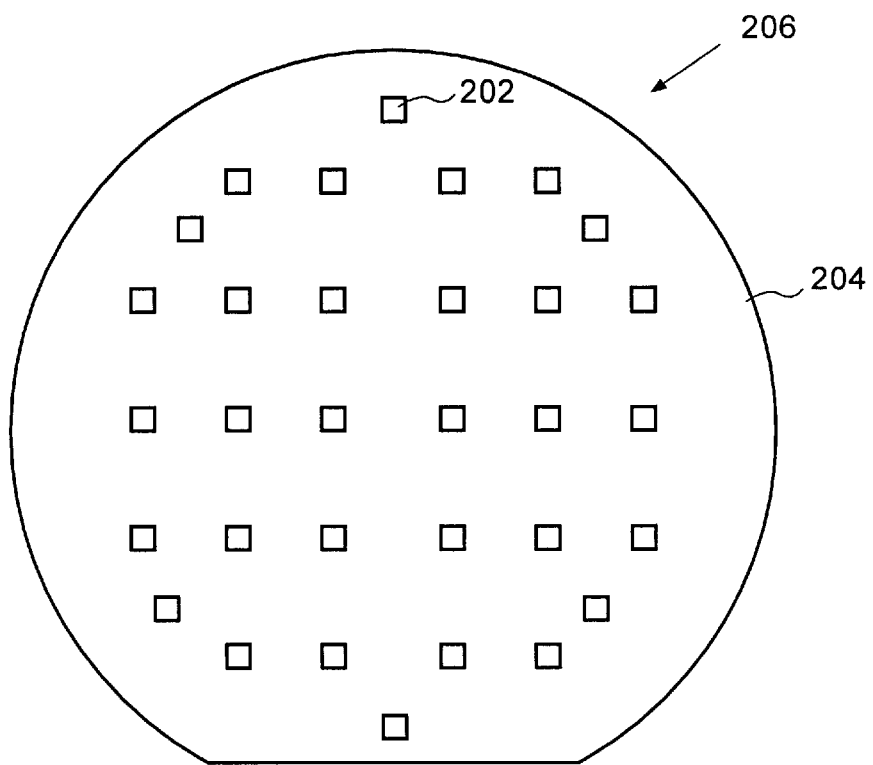
FIG. 2B shows a top view of a wafer incorporating pressure sensing structures according to another embodiment of the present invention.

FIG. 2A illustrates a top view of a wafer 200 according to an embodiment of the present invention. More specifically, FIG. 2A depicts the arrangement of multiple pressure transducers 202 on the wafer surface 204. Here, pressure transducers 202 are arranged in a crosswise manner on wafer 200. The number and arrangement of pressure transducers across wafer surface 204 can be varied depending on the particular application, and more specifically, according to the pattern of underlying structures in the wafer layer for which the CMP is to be calibrated. For example, for a particular underlying structure pattern, it may be desired to measure the pressure experienced by the wafer surface on a gross level across two axes of the wafer surface. Such measurement could be performed by a monitor wafer having the pressure transducer pattern shown in FIG. 2A. On the other hand, more detailed and localized pressure information may be needed for other types of underlying structure patterns. For example, FIG. 2B illustrates a pressure transducer arrangement according to another embodiment of the present invention.

FIGS. 3A–3H illustrate a process for forming a single pressure sensing structure 300, including a pressure transducer 202, within wafer 200 according to an embodiment of the present invention. Although the following discussion specifically describes the formation of a single pressure sensing structure 300, each operation can be performed in each of the locations across the wafer where a pressure sensing structure or other device is desired. Thus, for example, when patterning of a metallization layer to form a transducer element is described, other transducer elements can be formed on that same layer, during the same operation.

Figure 3A:
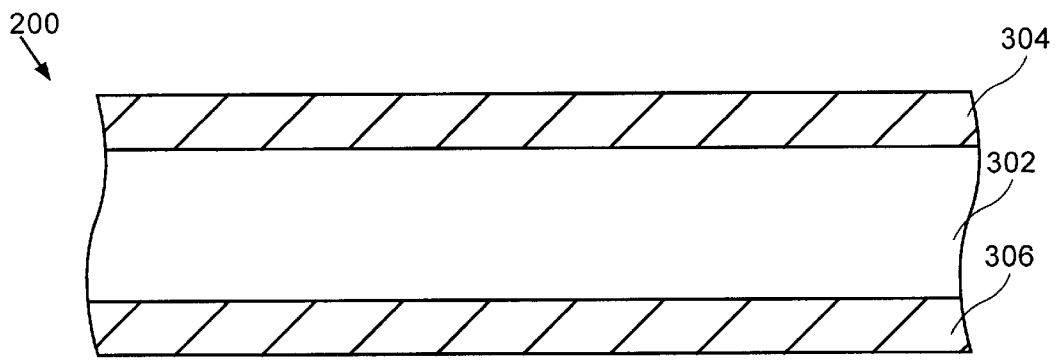
FIGS. 3A through 3H depict a cross-sectional view of a partially fabricated wafer at different stages of a fabrication process, according to an embodiment of the present invention.

FIG. 3A shows a cross-sectional view of a silicon substrate 302 covered on both a front side and a back side with silicon nitride layers 304 and 306, respectively. Silicon nitride layers 304 and 306 can be formed by any suitable process including a low pressure chemical vapor deposition (LPCVD) process. Silicon nitride layers 304 and 306 can be deposited separately, for example by depositing a layer to one side of the wafer, turning over the wafer, and then depositing a layer to the other side. Alternatively, silicon nitride layers 304 and 306 can be formed in the same operation by suspending the substrate in a chamber and depositing silicon nitride to both exposed surfaces of the substrate. By way of example, such simultaneous application can be performed using a horizontal furnace deposition process. Although silicon nitride layers 304 and 306 can typically have a thickness that ranges between about 2,000 Å and about 10,000 Å, a preferred thickness of about 5,000 Å works well.

Figure 3B:
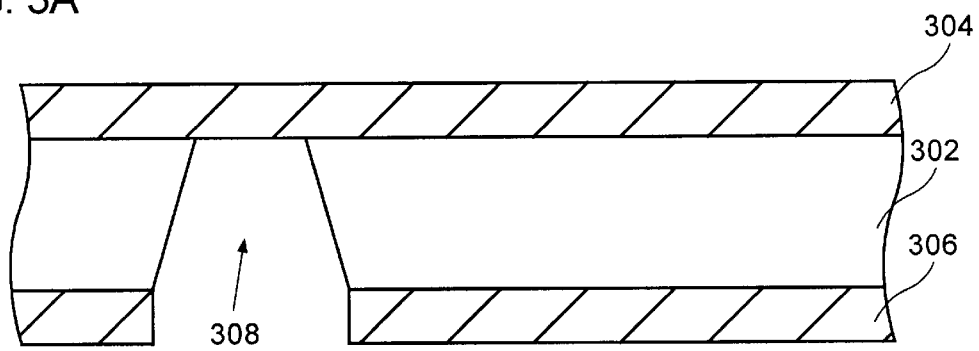

The fabrication continues with processing the back side of wafer 200. As shown in FIG. 3B, the fabrication includes the formation of a through-hole 308 through silicon nitride layer 306 and silicon substrate 302. Through-hole 308 is formed by first spin coating a photoresist layer (not shown) over silicon nitride layer 306 and patterning the photoresist material to form a photoresist mask, using any number of well known techniques including conventional photolithography. Once the photoresist mask has been formed, a plasma etching operation is performed to remove the portion of silicon nitride layer 306 that is not covered by the photoresist mask. Although any plasma etcher may be used, one exemplary plasma etcher is a Lam Research TCP 9600 SE etcher, that is available from Lam Research of Fremont, Calif.

During this etch, silicon nitride layer 304 can be protected, if desired, by covering silicon nitride layer 304 with a protective photoresist coating. The photoresist overlying silicon nitride layer 306 and, if used, a photoresist layer over silicon nitride layer 304, are next stripped. Afterwards, silicon substrate layer 302 is etched through to silicon nitride layer 304 in the region where silicon nitride layer 306 was etched, thus forming through-hole 308. The etching of silicon substrate layer 302 can be accomplished with any suitable process that is selective to silicon nitride layer 304. For example, the etch can be performed with an anisotropic potassium hydroxide (KOH) etch process which is highly selective to silicon nitride, thus substantially limiting the etch to silicon substrate 302. The through-hole can have a width substantially in the range of about 5 to about 50 microns, with a preferred width of about 25 microns.

Figure 3C:
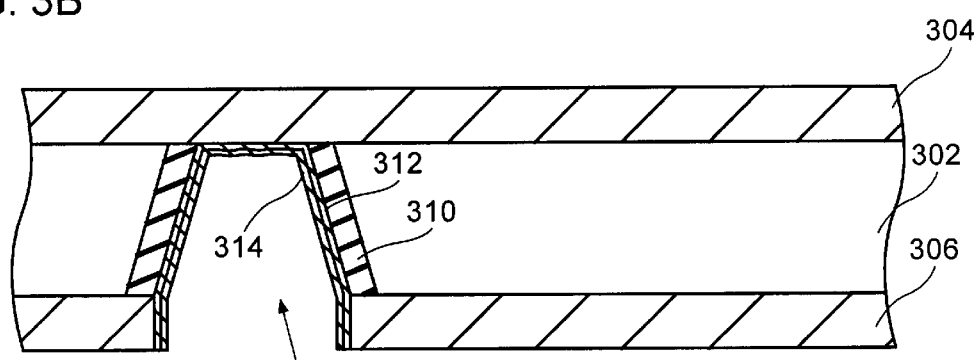
Figure 3D:
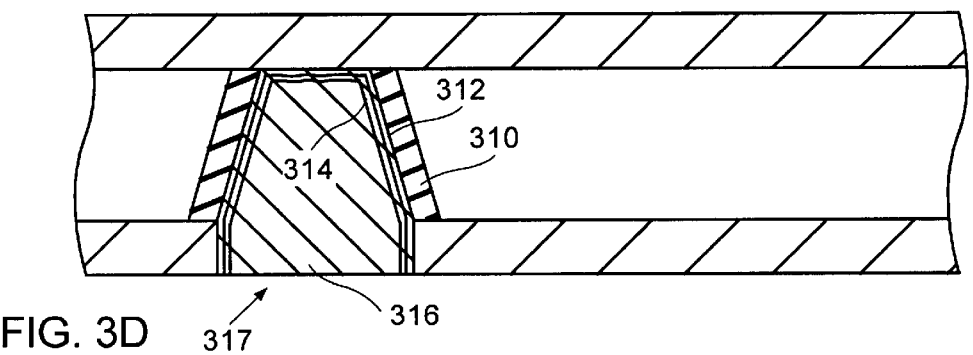

FIG. 3C depicts a cross-sectional view of wafer 200 after the walls of through-hole 308, formed of silicon substrate layer 302, have been oxidized to form oxide sidewalls 310. While oxide sidewalls 310 can be formed to a thickness substantially within the range of about 500 Å to about 5,000 Å, they are preferably about 1,000 Å thick. Oxide sidewalls 310 can be formed by any suitable process known to those of skill in the art. For example, the wafer can be exposed to oxygen or water vapor, respectively, in a wet or dry oxidation process. An adhesion layer 312 is next deposited over oxide sidewalls 310, the adhesion layer being further covered with a seed layer 314. Adhesion layer 312 can be formed of any suitable material, such as chromium. A preferred thickness for the adhesion layer 312 is between about 200 Å and about 1,000 Å, and most preferably about 500 Å. Likewise, seed layer 314 can be formed of any suitable material such as copper, gold or nickel. Through-hole 308 is then electroplated with through-hole fill layer 316, which can be nickel, copper, gold, aluminum or any other suitable material, thus forming the multi-layer conductive via 317, as shown in FIG. 3D. After the electroplating is performed, the backside of wafer 200 is planarized utilizing chemical mechanical polishing (CMP). The CMP process is preferably stopped at silicon nitride layer 306.

Other techniques used for making conductive vias are described in the articles entitled "A Plated Through-Hole Interconnect Technology in Silicon," by Maha A. S. Jaafar and Denice D. Denton in Journal of the Electrochemical Society, Vol. 144, No.7, p. 2490; and "Wafer Through-Hole interconnections with High Vertical Wiring Densities," by Carsten Christensen, et al., in IEEE Transactions of Components, Packaging, and Manufacturing Technology, Part A, Vol. 19, No. 4, December 1996, p. 516, which are incorporated herein by reference.

Figure 3E:
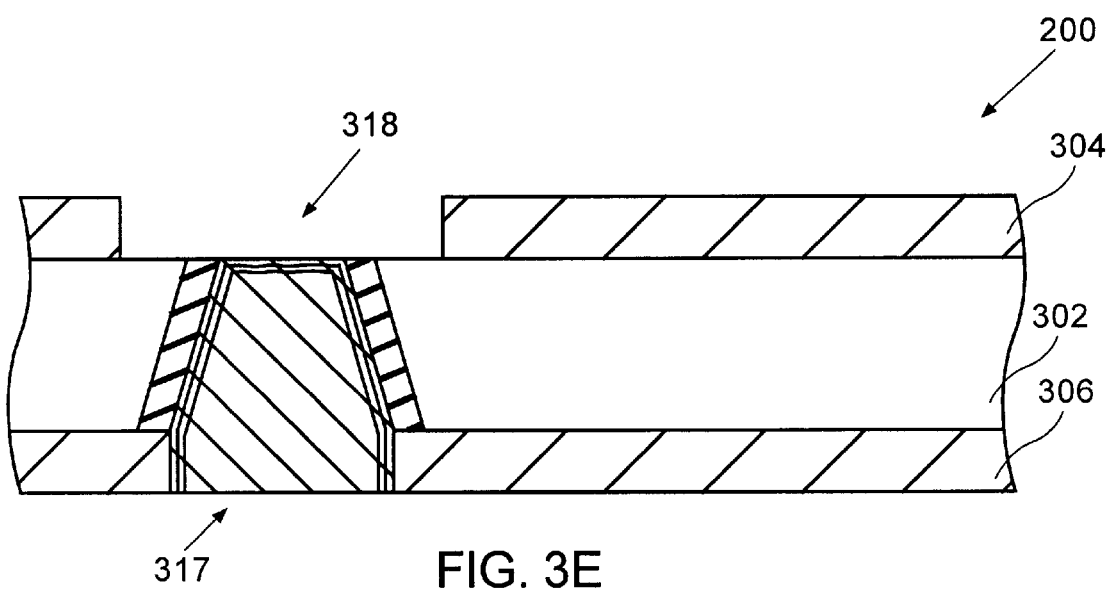
Figure 3F:
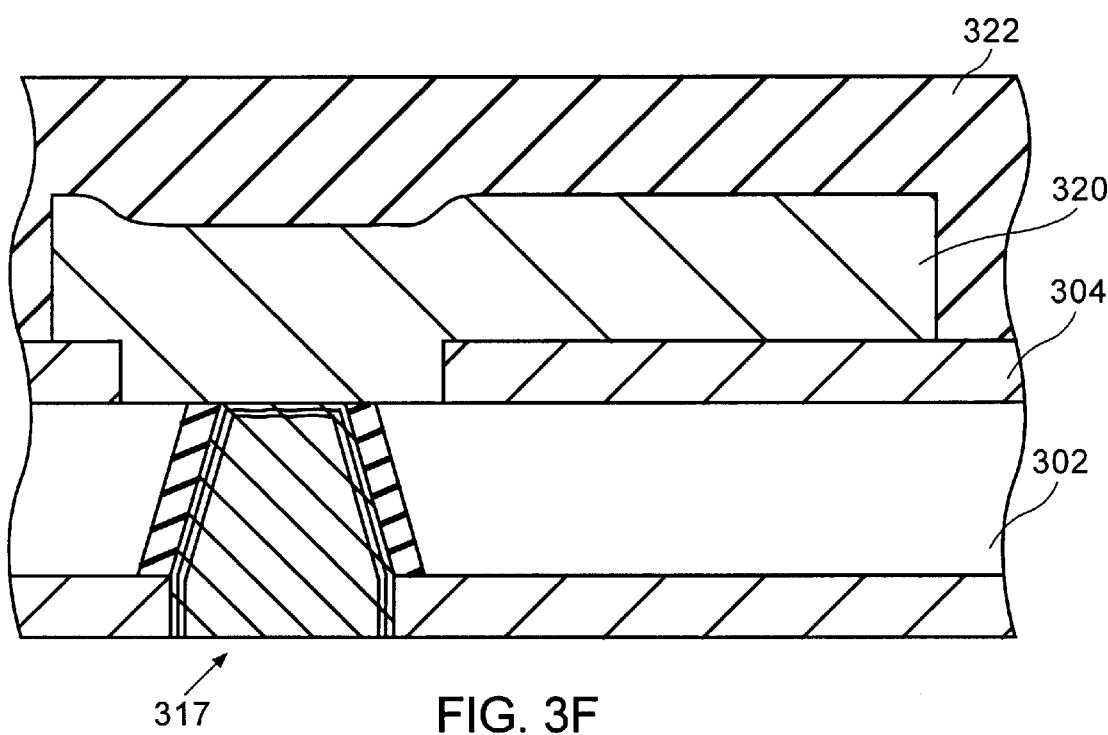
Figure 3G:
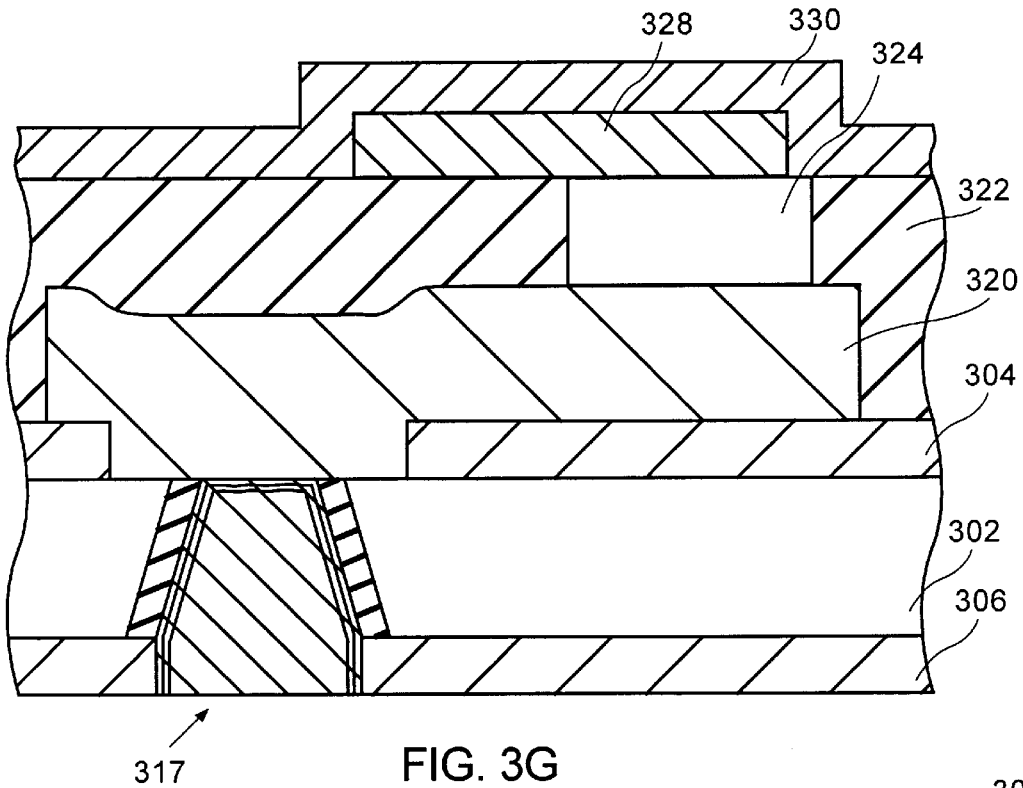

The formation of the pressure transducer in wafer 200 continues with processing the front side of wafer 200, beginning with a CMP operation on the front side, if necessary. This CMP operation may not be necessary if the surface of silicon nitride layer 304 is planar after all above described processing of the back side of wafer 200 has been completed. Once silicon nitride layer 304 is planar, silicon nitride layer 304 is etched down to conductive via 317 to form a contact 318 as shown in FIG. 3E. After the photoresist mask used to etch silicon nitride layer 304 is stripped off, a metal stack is deposited over silicon nitride layer 304, and filling contact 318. Preferably, an aluminum and titanium nitride combination is used to form the metal stack, but any suitable material known to those skilled in the art can also be used alternatively. The metal stack is then etched to form a lower transducer element 320, providing a first conductive portion of the transducer, depicted in FIG. 3F. Lower transducer element 320 can have a thickness substantially in the range of about 4,000 Å to about 10,000 Å, with a thickness of about 7,500 Å working well. The photoresist mask used to form lower transducer element 320 is then stripped, after which a dielectric layer such as intermetalic oxide (IMO) layer 322 is deposited over the lower transducer element 320. While IMO layer 322 can be substantially in the range of about 4,000 Å to about 10,000 Å thick, a thickness of about 8,000 Å works well.

IMO layer 322 is then patterned and etched to form various vias to the patterned metal stack. These vias include a cavity 324, shown in FIG. 3G, extending through IMO layer 322 to the portion of the patterned metal stack forming lower transducer element 320. Cavity 324 preferably has a diameter that ranges from about 1 to about 20 microns, and more preferably has a diameter that is about 3 microns. A tungsten plug layer (not shown) is deposited over oxide layer 322 and into cavity 324 to provide mechanical support for a subsequently formed upper transducer element 328. The tungsten is then polished by CMP substantially to the IMO layer 322, such that substantially the only remaining tungsten fills cavity 324 (i.e., which forms tungsten plugs). An upper metal layer is next applied over IMO layer 322 and the tungsten filled cavity 324. The upper metal layer is then etched to form upper transducer element 328, providing a second conductive portion of the transducer, which mostly but not completely overlies cavity 324 that is filled with tungsten.

Having provided mechanical support for the formation of upper transducer element 328, the tungsten must be removed from cavity 324 before a next layer is deposited over IMO layer 322 and upper transducer element 328. Therefore, a portion of the tungsten that fills the cavity 324 is left exposed to enable a basic solvent chemical (that is used as part of a standard resist strip operation) to come in contact with the tungsten which fills cavity 324. When tungsten is used to fill the cavity, it is desired that the solvents have a pH greater than about 10; for example, an ST 26 solvent can be used.

It should be understood that cavity fill material other than tungsten can be used, as long as a solvent can be used that will dissolve the cavity fill material which substantially will not dissolve IMO oxide layer 322 and upper transducer element 328 during the immersion. Of course, during the immersion, the photoresist mask used to etch the upper metal layer is also stripped.

For more information on forming pressure transducers in a semiconductor wafer, reference can be made to U.S. patent application Ser. No. 08/995,500 (Attorney Docket No. VTI1P181) entitled "Semiconductor Pressure Transducer Structures and Methods for Making the Same" filed on Dec. 22, 1997 by Subhas Bothra, et al., now U.S. Pat. No. 5,928,968 issued Jul. 27, 1999 which is incorporated herein by reference.

The front side of wafer 200 is then capped with a silicon nitride layer 330, thus enclosing cavity 324. Thus, pressure transducer 202 is completed, including upper and lower transducer elements 328 and 320, and cavity 324 between the two transducer elements. Silicon nitride layer 330 can be substantially in the range of about 1,000 Å to about 5,000 Å thick, with about 3,000 Å working well. Alternatively, any other suitable material can be used to cap the front side of wafer 200, however, it is preferable that the material be somewhat resistant to the polishing process to be monitored in the CMP machine. For example, when a oxide polishing process is to be monitored, a silicon nitride layer works well. In addition, any process of forming silicon nitride layer 330 can be used, such as a plasma enhanced chemical vapor deposition (PECVD) process.

It should be understood that throughout the above described operations, the etching of the various layers also includes the formation of metallization patterns and conductive vias which result in electrical contacts to the upper transducer element 328, which extends through silicon nitride layer 306 to the back side of wafer 200. By providing such connection, there is no need for a connection through the front side, which would be inconsistent with usage during a CMP operation.

To complete the structure of the wafer according to the present invention, a metal layer is then deposited over silicon nitride layer 306. The metal used is preferably the same material forming through-hole fill layer 316, and can be in a range of about 1 to about 3 microns thick, and most preferably about 1.5 microns thick. This metal is then etched to form a patterned metallization feature, here shown as a connector 332 in FIG. 3H, in electrical contact with conductive via 317. Although not shown, an inter-connection (as shown in FIG. 4B) is also formed to complete electrical connection to the upper transducer element 328, which extends through interconnect structures down to the silicon nitride layer 306. Thus, for each set of the upper and the lower transducers formed in wafer 200, electrical connections to each are routed down to the backside of wafer 200.

In the embodiment described above, each layer of features to be formed by photolithography advantageously has characteristics which lend themselves well to one shot masks. For example, a reticle that contains the pattern desired for the entire wafer surface at that particular layer being formed, can be used to define the photoresist mask of the entire wafer surface at one time. Thus, the time and cost of fabricating a wafer according to the present invention can be minimized.

Figure 3H:
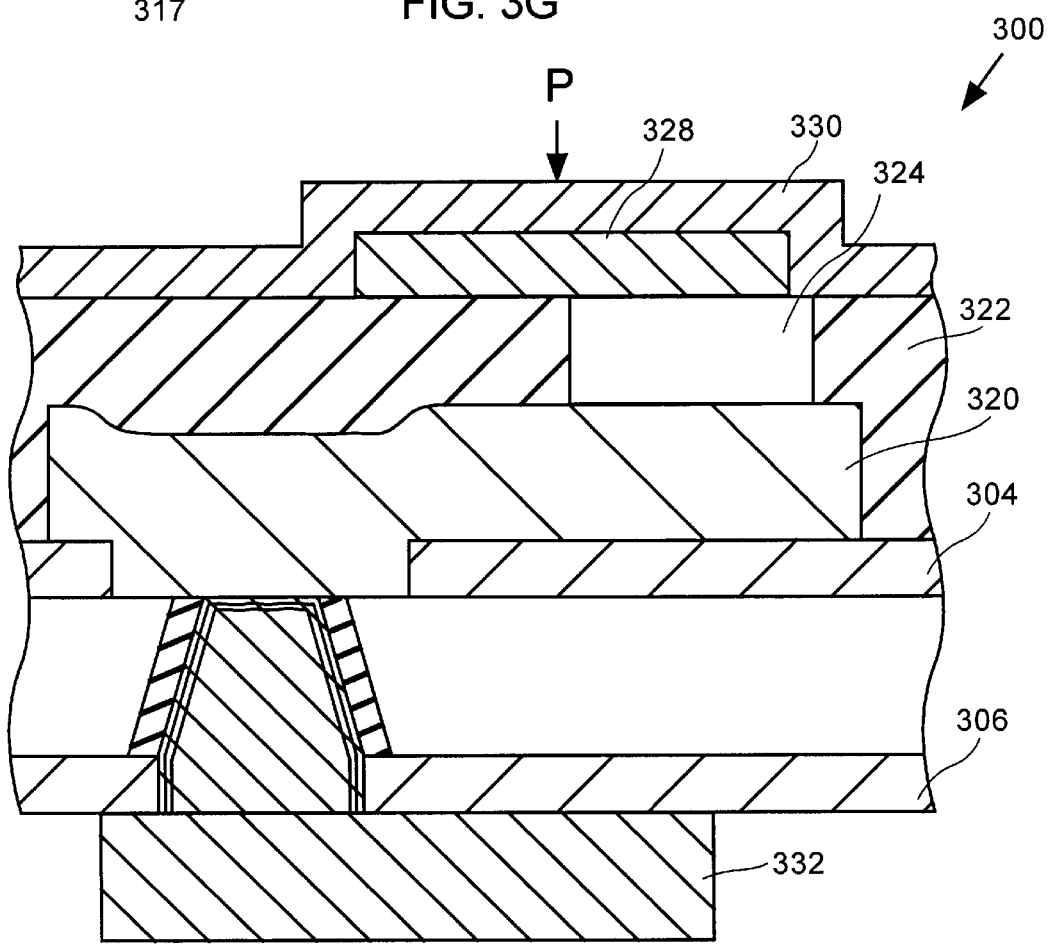

In the example shown in FIG. 3H, a local pressure P is shown applied to silicon nitride layer 330 that lies over upper transducer element 328 and cavity 324. With the application of local pressure P, the upper and lower transducer elements move closer together in the region of cavity 324, changing the capacitance between the upper and lower transducer elements. Further, this change in capacitance can be measured through the electrical connections to the upper and lower transducer elements. By measuring the new capacitance, the magnitude of the pressure P can be accurately determined.

Figure 4A:
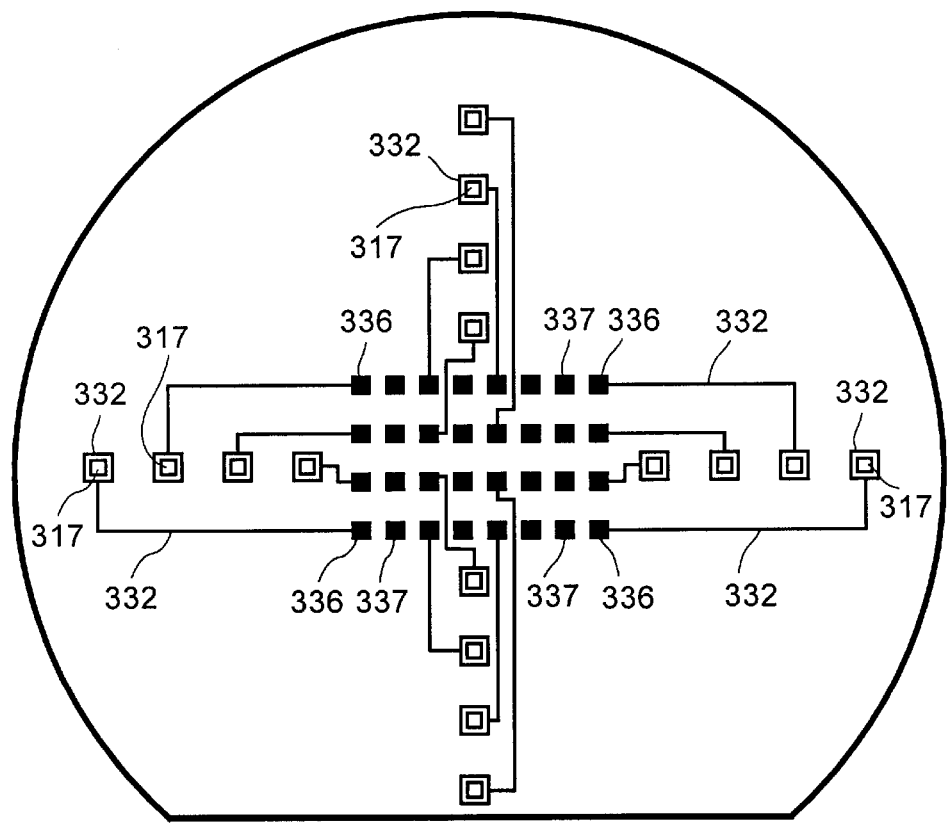
FIG. 4A shows a bottom view of the wafer shown in FIG. 2A, according to an embodiment of the present invention.
Figure 4B:
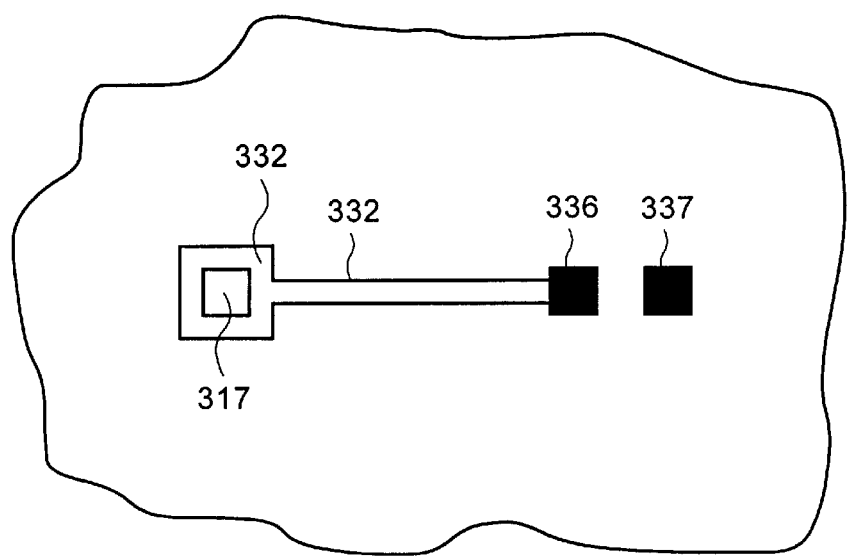
FIG. 4B shows an enlarged view of a portion of the wafer shown in FIG. 4A, according to an embodiment of the present invention.

FIG. 4A shows a bottom view of wafer 200. Connectors 332 overlying conductive vias 317, which connect to pressure transducers 202, are patterned to connect conductive via 317 electrically with conductive pins, shown here as primary contact pads 336. In the depicted embodiment, for each pressure transducer there is also a connection (not shown) to the upper transducer element, each of which electrically connect the pressure transducer to a single secondary contact pad 337.

For ease of understanding, FIG. 4B shows an enlarged view of a portion of the back side of wafer 200 shown in FIG. 4A. FIG. 4B more clearly shows the form of connector 332. Although connectors 332 can take the form depicted in FIG. 4B, they may take any suitable form that provides electrical connection with primary contact pads 336. It is to be understood that secondary contact pad 337 is connected, through the wafer layers, to the upper transducer element. With this configuration, pressure can be measured from a single transducer using a pair of pads 336 and 337.

Figure 6:
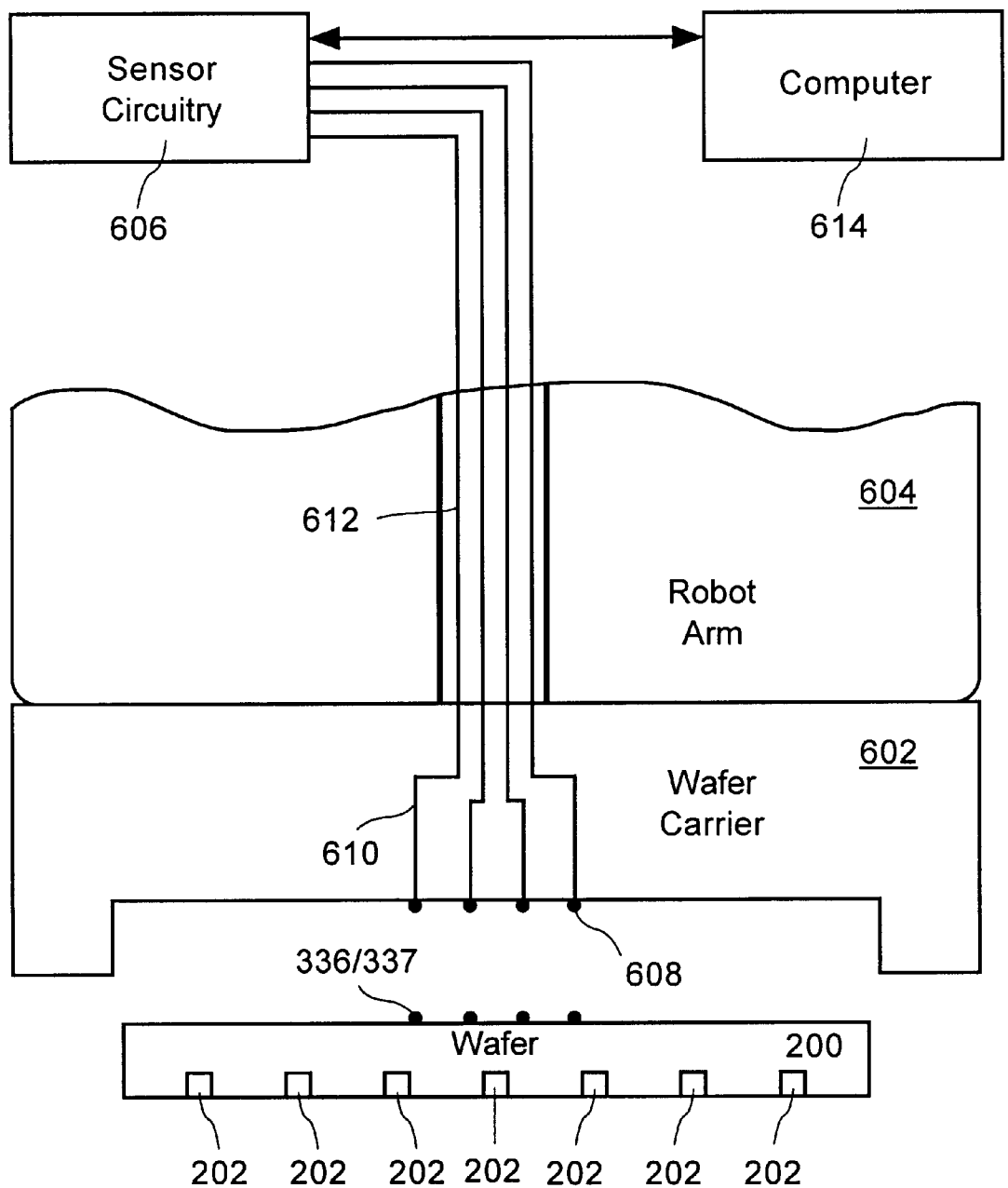
FIG. 6 depicts a wafer carrier and related apparatus according to a further embodiment of the present invention.

With these two pads per pressure transducer, sixteen primary contact pads 336 and sixteen secondary contact pads 337 are provided for sixteen pressure transducers 202. Primary contact pads 336 and secondary contact pads 337 are arranged on the back side of wafer 200 such that they can provide electrical connection through the wafer carrier of the CMP machine to sensing equipment (shown in FIG. 6), for receiving, processing, and recording the pressure transducer 202 information. Alternatively, the wafer can be fabricated without contact pads, with connectors 332 to the conductive vias 317 and the connections (not shown) to the upper transducer elements directly providing electrical connection to the wafer carrier.

In embodiments such as described above, where two contact pads are needed for each pressure transducer used, the number of pressure transducers 202 that can be incorporated across wafer 200 is limited by the number of contact pads and connectors 332 that can be fit on the back side of wafer 200. Further, the mounting arm of the CMP machine may have a limited area available to connect to the contact pads. For example, a wafer having a diameter of about eight inches, could accommodate approximately up to 50 pressure transducers.

Figure 5:
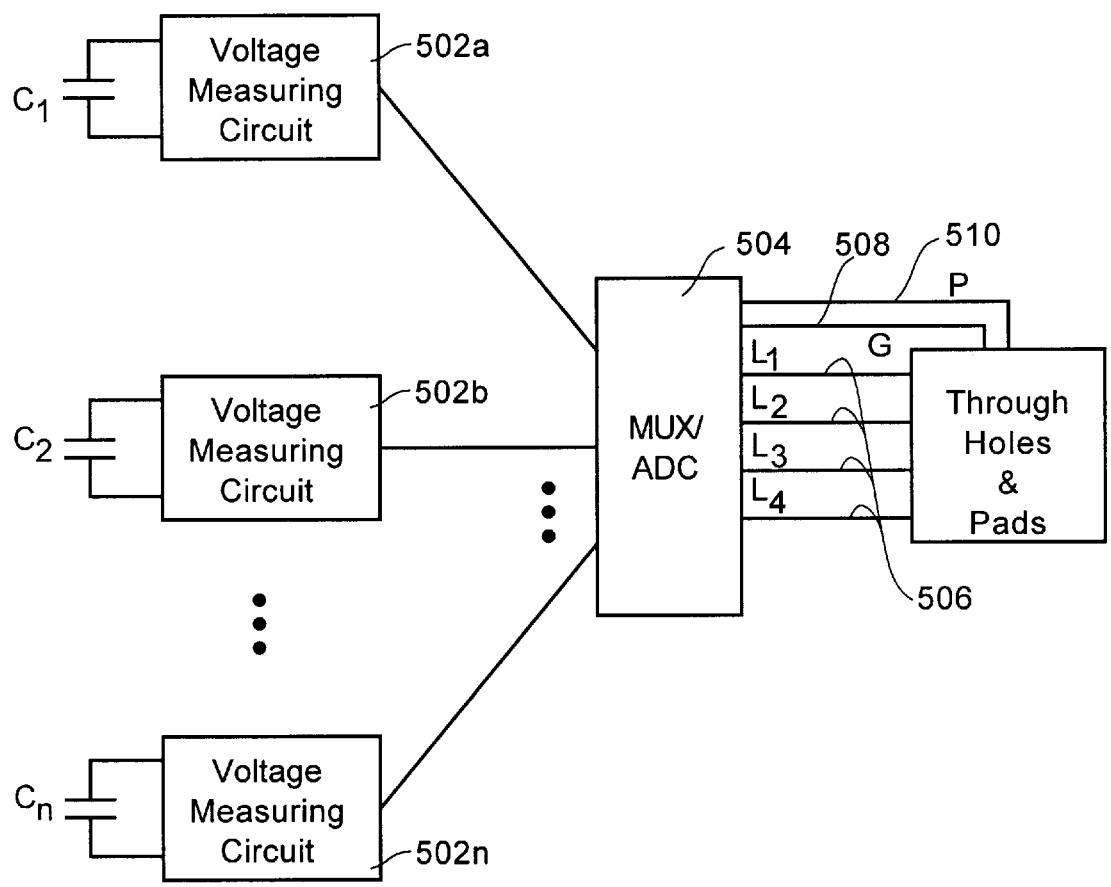
FIG. 5 is a schematic diagram of a pressure sensing structure within a wafer, according to another embodiment of the present invention.

In another embodiment of the present invention, the number of pressure transducers used can be increased without increasing the number of contact pads necessary on the back side of wafer 200. This is accomplished with additional integrated circuitry in the wafer, which can pre-process inputs from a number N pressure transducers and output the processed data corresponding to the multiple pressure transducers, through a number of contact pads 336 which is less than N. FIG. 5 is a schematic illustrating this embodiment of the present invention. Each pressure transducer is connected to a separate voltage measuring circuit 502 which measures the capacitance across the pressure transducer. Thus, for example, a first voltage measuring circuit 502a measures the capacitance $C_1$ from a first pressure transducer (not shown). Also, a multiplexer and analog-to-digital converter (ADC) 504 is provided which receives the measured data output from the voltage measuring circuits 502. The multiplexer/ADC 504 then operates on the analog capacitance information received, and outputs digital capacitance information on output lines 506.

Due to the multiplexer properties, the number of output lines 506 from multiplexer/ADC 504 is dependent only upon the measuring resolution desired, and can be significantly less than the number of pressure transducers from which information is received. For example, where the maximum measured voltage is one volt, a resolution of 1:16 can be achieved with four outputs. Likewise, using five output lines would achieve a 1:32 resolution, whereas six output lines would achieve a 1:64 resolution, and so on. The capacitance from each pressure transducer can be successively output using all of the output lines. For example, in the system shown in FIG. 5, the four lines can be used first to output a digital signal representative of the capacitance $C_1$ of the first pressure transducer. Afterwards, the same four lines would be used to output a digital signal representative of the capacitance $C_2$. The same then can be done for each of the pressure transducers coupled with the multiplexer/ADC 504, through $C_n$. The sensing equipment connected to the back side of the wafer through the wafer carrier would then be configured to interpret the digital signals and from them determine the pressures applied to the wafer. Thus, for the embodiment shown in FIG. 5 having a resolution of 1:16, four output lines 506, one ground line 508, and one power line 510 could be used. Thus, a total of six lines and thus six contact pads can be used to obtain pressure data from an N number of pressure transducers, where N may be significantly greater than six. Thus, in this embodiment of the present invention, significantly more pressure transducers can be included across the wafer surface. Although any number of pressure transducers that can fit on the wafer surface can be used, in one embodiment 100 pressure transducers works well.

In yet another embodiment of the present invention, a wafer carrier 602 is provided to be used in conjunction with the CMP monitoring wafer of the present invention. As discussed above with reference to the related art, a wafer carrier holds the wafer in a CMP machine, with the back side of the wafer in contact with the wafer carrier. Because the embodiments of the CMP monitoring wafer discussed above incorporate connectors to contact pads 336 and 337 on the back side of wafer 200, a wafer carrier 602 can be provided which provides electrical connection from contact pads 336 and 337 to a sensor 606 located separately from wafer 200. In accordance with this embodiment of the present invention, the wafer carrier 602 has a first surface that receives and is in contact with the back side of the wafer during the CMP process. This first surface includes multiple wafer carrier conductive pads 608, at least some of which correspond in arrangement to the contact pads of the wafer. Thus, during operation, each of the contact pads of the wafer electrically connects to a wafer carrier conductive pad 608. Further, electrical connectors 610 are incorporated in wafer carrier 602, with one end of each electrical connector 610 being electrically connected to one of the wafer carrier conductive pads 608. Another end of each electrical connector 610 can then be used to provide electrical connection to the sensor 606 that is located outside of wafer 200. By way of example, electrical connectors 610 can be connected to wires 612 routed through a robot arm 604 of the CMP machine which holds wafer carrier 602. Wires 612 can be further routed to sensor 606 for determining the pressures encountered by the wafer, with sensor 606 mounted alongside the CMP machine. Sensor 606 may also be connected to a computer 614 for manipulation, recording or monitoring of the pressure information from wafer 200.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An apparatus for measuring a local pressure on a surface of a wafer while the wafer is subjected to a chemical mechanical polishing process, the apparatus comprising:

a wafer having a front side provided with a surface to be subjected to the local pressure, a back side provided with a substrate, a pressure sensing structure between the surface and the substrate for generating information related to the local pressure on the surface, and conductive vias extending from the structure through the substrate to the back side;

a chemical mechanical polishing unit for applying pressure to the surface of the wafer at the front side of the wafer;

conductive pads connected to the conductive vias for collecting the information related to the local pressure from the pressure sensing structure; and sensor circuitry effective during operation of the chemical mechanical polishing unit for determining the magnitude of the local pressure from the information related to the local pressure.

2. An apparatus for measuring as recited in claim 1, wherein the chemical mechanical polishing unit has operating parameters, and wherein the sensor circuitry is further effective during operation of the chemical mechanical polishing unit for setting the operating parameters of the chemical mechanical polishing unit to attain desired pressure distributions across the surface of the wafer.

3. A wafer carrier for chemical mechanical polishing of a pressure transducer wafer having a a front side defining a surface for receiving the chemical mechanical polishing and pressure during the chemical mechanical polishing, a back side comprising a substrate, a conductive via extending through the substrate from a first side adjacent to the front side to a second side adjacent to the back side, and a conductor pad assembly on the back side and arranged in electrical contact with the second side of the conductive via, the wafer carrier comprising:

a first surface configured to receive the back side of the wafer while allowing the surface of the front side of the wafer to be exposed for receiving the chemical mechanical polishing and pressure;

a second surface configured to be coupled with a chemical mechanical polishing machine that applies the pressure to the surface of the wafer; and a plurality of wafer carrier conductive pads located on the first surface, selected ones of the plurality of wafer carrier conductive pads being arranged to electrically connect to at least the conductor pad assembly of the wafer when the wafer is received by the first surface of the wafer carrier.

* * * * *